(12) United States Patent
Cao et al.

(10) Patent No.: US 9,633,084 B2
(45) Date of Patent: Apr. 25, 2017

(54) INFORMATION SEARCHING METHOD AND DEVICE, AND COMPUTER STORAGE MEDIUM

(71) Applicant: TENCENT TECHNOLOGY (SHENZHEN) COMPANY LIMITED, Shenzhen, Guangdong (CN)

(72) Inventors: Yue Cao, Shenzhen (CN); Yuancheng Cao, Shenzhen (CN); Rui Liu, Shenzhen (CN); Wei Zou, Shenzhen (CN); Junsong Yang, Shenzhen (CN); Keke Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 285 days.

(21) Appl. No.: 14/247,475

(22) Filed: Apr. 8, 2014

(65) Prior Publication Data

US 2014/0236979 A1    Aug. 21, 2014

Related U.S. Application Data

(63) Continuation of application No. PCT/CN2013/072961, filed on Mar. 20, 2013.

(30) Foreign Application Priority Data

Apr. 9, 2012 (CN) .................. 2012 1 01015700

(51) Int. Cl.
*G06F 17/30* (2006.01)

(52) U.S. Cl.
CPC .... *G06F 17/3053* (2013.01); *G06F 17/30867* (2013.01); *G06F 17/30554* (2013.01); *G06F 17/30657* (2013.01)

(58) Field of Classification Search
CPC .......... G06F 17/30657; G06F 17/3053; G06F 17/30867; G06Q 10/10

(Continued)

(56) References Cited

U.S. PATENT DOCUMENTS

| 7,363,344 B1 * | 4/2008 | Coletrane ......... H04L 29/12783 455/466 |
| 7,702,685 B2 * | 4/2010 | Shrufi .................... G06Q 10/10 707/760 |

(Continued)

FOREIGN PATENT DOCUMENTS

| CN | 1811780 A | 8/2006 |
| CN | 101512524 A | 8/2009 |

(Continued)

OTHER PUBLICATIONS

International Search Report in international application No. PCT/CN2013/072961, mailed on May 16, 2013. (2 pages—see entire document).

(Continued)

*Primary Examiner* — Frantz Coby
(74) *Attorney, Agent, or Firm* — Oppedahl Patent Law Firm LLC

(57) ABSTRACT

It is described an information searching method and device and a computer storage medium, which belong to the field of computers. The method includes that: a keyword for search input by a user is acquired, and user information of the user is acquired as well; and search is performed according to the keyword and the user information to obtain searched-out information that matches the keyword o and is relevant to the user information. The device includes an acquiring module and a searching module. The computer storage medium stores a computer program for executing the method. With the method, it is possible to perform search according to the acquired keyword and the user information (Continued)

to obtain searched-out information that matches the keyword and is relevant to the user information. The information obtained with the searching method described herein is highly relevant to the user, thereby enhancing the relevance between the searched-out information and the user.

9 Claims, 2 Drawing Sheets

(58) Field of Classification Search
USPC ............... 707/706, 732, 765, 741, 609, 760; 709/218
See application file for complete search history.

(56) References Cited

U.S. PATENT DOCUMENTS

| | | | |
|---|---|---|---|
| 7,783,636 B2* | 8/2010 | Church | G06F 17/30657 707/732 |
| 8,239,361 B2* | 8/2012 | Kang | G06F 17/30943 707/706 |
| 8,244,692 B1 | 8/2012 | Levy | |
| 8,583,959 B2* | 11/2013 | Peng | G06F 11/1417 707/609 |
| 8,832,132 B1* | 9/2014 | Spertus | G06F 17/30669 707/765 |
| 8,832,569 B2* | 9/2014 | Chen | G06Q 10/10 715/758 |
| 9,275,119 B2* | 3/2016 | Rubinstein | G06F 17/30554 |
| 2007/0168444 A1* | 7/2007 | Chen | G06Q 10/109 709/207 |
| 2008/0059455 A1 | 3/2008 | Canoy et al. | |
| 2008/0249997 A1* | 10/2008 | Sun | G06F 17/30587 |
| 2008/0320102 A1* | 12/2008 | Rordam | G06F 17/3071 709/218 |
| 2009/0150803 A1* | 6/2009 | Ross | G06Q 10/107 715/758 |
| 2011/0320441 A1 | 12/2011 | Lee et al. | |
| 2012/0131009 A1* | 5/2012 | Nath | G06F 17/30867 707/741 |
| 2014/0258432 A1* | 9/2014 | Zheng | H04L 12/1827 709/206 |

FOREIGN PATENT DOCUMENTS

| | | |
|---|---|---|
| CN | 101556588 A | 10/2009 |
| CN | 102298612 A | 12/2011 |
| EP | 2264625 A1 | 12/2010 |

OTHER PUBLICATIONS

English Translation of the Written Opinion of the International Search Authority in international application No. PCT/CN2013/072961, mailed on May 16, 2013. (8 pages—see entire document).

* cited by examiner

INFORMATION SEARCHING METHOD AND DEVICE, AND COMPUTER STORAGE MEDIUM

CROSS REFERENCE TO RELATED APPLICATIONS

This is a continuation application of International Patent Application No. PCT/CN2013/072961, filed on Mar. 20, 2013, which claims priority to Chinese Patent Application No. 201210101570.0 filed on Apr. 9, 2012, the disclosure of which is incorporated by reference herein in its entirety.

TECHNICAL FIELD

The present disclosure relates to the field of communications, and in particular to an information searching method and device and a computer storage medium.

BACKGROUND

With the development of communication technology, a user may acquire various kinds of information he/she needs via the Internet which contains rich and diverse information. Therefore, the user needs to perform search via a search engine so as to rapidly obtain information he/she needs.

At present, a specific process in information search via a search engine is as follows: a keyword for search input by a user is acquired, a network is searched for information matching the keyword, and the found information matching the keyword is displayed to the user.

However, with such an information searching method, only the information matching the keyword can be found according to the keyword input by the user, but information obtained by such a search may have low relevance with the user, leading to low search efficiency and affecting the user experience.

SUMMARY

To solve the problem of related art, embodiments of the present disclosure provide an information searching method and device and a computer storage medium, capable of increasing the relevance between the result of search and the user who conducts the search, thus improving search efficiency and enhancing the user experience.

Technical solutions proposed in embodiments of the present disclosure are as follows.

An information searching method includes:

a keyword for search input by a user is acquired, and user information of the user is acquired too; and search is performed according to the keyword and the user information to obtain searched-out information that matches the keyword and is relevant to the user information.

An information searching device includes:

an acquiring module configured to acquire a keyword for search input by a user, and acquire user information of the user; and a searching module configured to perform search according to the keyword and the user information to obtain searched-out information that matches the keyword and is relevant to the user information.

It is provided a computer storage medium stores computer-executable instructions for executing the information searching method.

With the information searching method and device and the computer storage medium according to embodiments of the present disclosure, user information is acquired while acquiring a keyword for search input by a user; then, search is performed according to the acquired keyword and the user information to obtain searched-out information that matches the keyword and is relevant to the user information. Beneficial effects of a technical solution provided in embodiments of the present disclosure are as follows: it is possible to perform search according to the acquired keyword and the user information to obtain searched-out information that matches the keyword and is relevant to the user information, and information obtained with the searching method described herein is highly relevant to the user, enhancing the relevance between the searched-out information and the user, thereby increasing search efficiency and enhancing the user experience.

DETAILED DESCRIPTION

To clearly show a technical solution and beneficial effects of the present disclosure, the present disclosure is further elaborated below with reference to the drawings and

EMBODIMENTS

Embodiment 1

Figure 1:
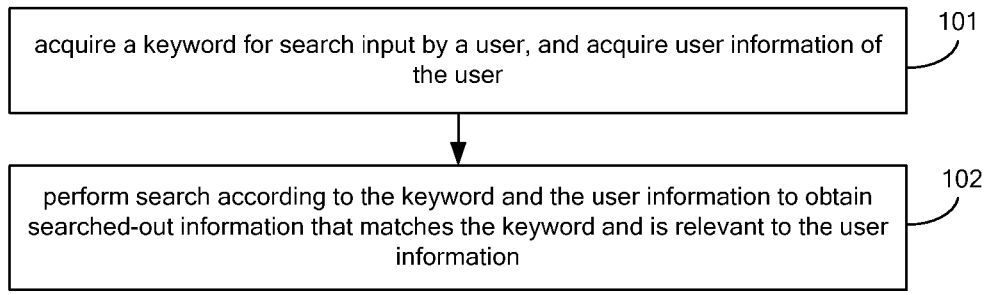
FIG. 1 is a flowchart of an information searching method provided in Embodiment 1 of the present disclosure.

Referring to FIG. 1, an embodiment of the present disclosure provides an information searching method, including the steps of:

101: a keyword for search input by a user is acquired, and user information of the user is acquired as well; and 102: search is performed according to the keyword and the user information to obtain searched-out information that matches the keyword and is relevant to the user information.

In some examples, the user information may include basic personal information of the user and/or friend information of the user.

In some examples, the step 102 may be implemented as follows:

search is performed according to the keyword and the basic personal information of the user to obtain searched-out information that matches the keyword and is relevant to the basic personal information of the user; and/or search is performed according to the keyword and the friend information of the user to obtain searched-out information that matches the keyword and is relevant to the friend information of the user.

In some examples, the method may further include: the searched-out information is displayed.

In some examples, the searched-out information may be displayed in a direct area.

In some examples, the method may further include:

searched-out information that matches the keyword and is relevant to the friend information of the user is sent to a friend of the user when a friend notification information sent by the user is received.

With the information searching method according to an embodiment of the present disclosure, it is possible to perform search according to the acquired keyword and the user information to obtain searched-out information that matches the keyword and is relevant to the user information. The information obtained with the described searching method is highly relevant to the user, thereby enhancing the relevance between the searched-out information and the user. Search may be performed according to the keyword and the basic personal information of the user or according to the keyword and the friend information of the user, so as to obtain searched-out information that matches the keyword and is relevant to the basic personal information of the user, or searched-out information that matches the keyword and is relevant to the friend information of the user, such that not only information the user himself/herself needs may be found, but information relevant to the present keyword and needed by a friend of the user may also be found via the friend information of the user, thus further enhancing the relevance between the searched-out information and the user. The searched-out information that matches the keyword and is relevant to the friend information of the user may be sent to a friend of the user, which increases interaction between the user and a friend of the user. The searched-out information that matches the keyword and is relevant to the user information may be displayed by using a direct-area service, so that the searched-out information is displayed straightforwardly.

Embodiment 2

Figure 2:
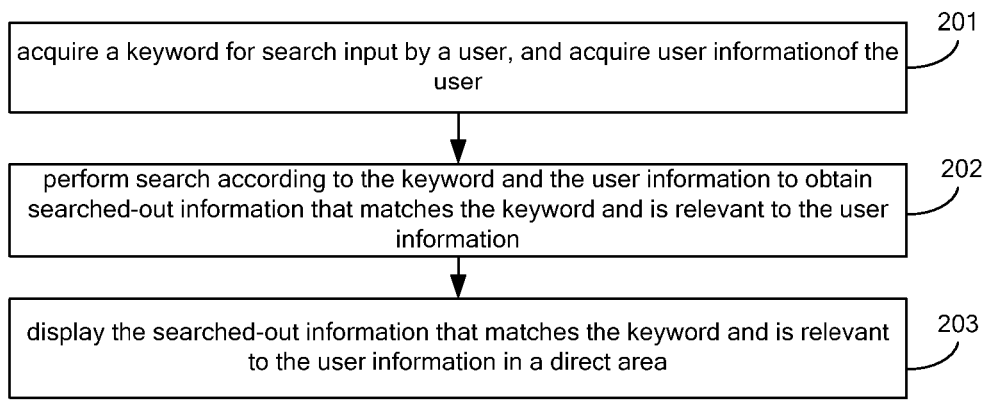
FIG. 2 is a flowchart of an information searching method provided in Embodiment 2 of the present disclosure.

Referring to FIG. 2, an embodiment of the present disclosure provides an information searching method, including the following steps.

In step 201, a keyword for search input by a user is acquired, and user information of the user is acquired as well.

In some examples, the user information may include basic personal information of the user and/or friend information of the user. The basic personal information of the user may include the name, sex, nationality, address, birthday, zodiac sign of the user and the like. The friend information of the user may include the number of friend of the user, as well as the name, sex, nationality, address, birthday, zodiac sign, and the like of each friend of the user.

Specifically, the user information may be acquired as follows.

In a first mode, before the user performs information search using the method according to an embodiment of the present disclosure, the user is required to register, and the user information is acquired from registration information of the user.

In a second mode, before the user performs information search using the method according to an embodiment of the present disclosure, the user is required to input an instant messaging number, a mobile phone number, and the like when registering, and the user information is acquired according to information such as the instant messaging number or the mobile phone number of the user.

Note that methods for acquiring the user information are not limited to the two mentioned mode, and may be selected from any other feasible methods according to an actual application.

In step 202, search is performed according to the keyword and the user information to obtain searched-out information that matches the keyword and is relevant to the user information.

In some examples, the scenario that the searched-out information is related to the user information may be that, for example: the keyword is weather, and the address of the user obtained from the user information is Beijing, then search is performed according to the keyword and the user information such that the obtained searched-out information that matches the keyword and is relevant to the user information is the weather in Beijing. By relating the searched-out information to the user information, the searched-out information will be of greater pertinence. For example, the searched-out information mentioned above is the weather in Beijing rather than the weather in another area such as Shanghai or Tianjing.

Specifically, when the user information includes the basic personal information of the user and/or the friend information of the user, the step that search is performed according to the keyword and the user information to obtain the searched-out information that matches the keyword and is relevant to the user information may include the step(s) of:

performing search according to the keyword and the basic personal information of the user to obtain searched-out information that matches the keyword and is relevant to the basic personal information of the user; and/or performing search according to the keyword and the friend information of the user to obtain searched-out information that matches the keyword and is relevant to the friend information of the user.

Furthermore, after obtaining the searched-out information that matches the keyword and is relevant to the basic personal information of the user, and the searched-out information that matches the keyword and is relevant to the friend information of the user, the method may include the following steps.

In step (1), the searched-out information that matches the keyword and is relevant to the basic personal information of the user, and the searched-out information that matches the keyword and is relevant to the friend information of the user are displayed to the user.

In some examples, the searched-out information that matches the keyword and is relevant to the basic personal information of the user, and the searched-out information that matches the keyword and is relevant to the friend information of the user may be displayed to the user in a direct area.

Specifically, after inputting a keyword for search, the user may directly see, at the top portion of the result of search, essence of the content matching the keyword, the block in which the essence of the content is located is called a "direct area". In an embodiment of the present disclosure, the essence of the content includes the searched-out information that matches the keyword and is relevant to the basic personal information of the user, and the searched-out information that matches the keyword and is relevant to the friend information of the user.

Note that when the searched-out information is displayed in a direct area, search is performed among high-quality formatted data on the Internet and high-quality data established by a company itself.

In step (2), notification information is received from the user, wherein the notification information is indicative of a request to send the searched-out information that matches the keyword and is relevant to the friend information of the user to a friend of the user.

In step (3), the searched-out information that matches the keyword and is relevant to the friend information of the user is sent to a friend of the user.

That is, when a friend notification information sent by the user is received, the searched-out information that matches the keyword and is relevant to the friend information of the user is sent to a friend of the user.

Specifically, the searched-out information that matches the keyword and is relevant to the friend information of the user may be sent to a friend of the user by using instant messaging chatting information, leaving a message in an instant messaging space, or sending a mobile phone short message, with no specific limit thereto.

For example, if the searched-out information is displayed by using a direct-area service, then after the user inputs a keyword "weather" in a direct area of weather, the weather of the location of the user may be returned according to the location of the user obtained from the instant messaging number information of the user. And the weather of the location of a friend of the user may be returned according to the location of a friend of the user obtained from the instant messaging number information, and a weather notification entrance of a friend of the user is displayed, such that the user may interact with the friend.

Note that if the location of the user cannot be obtained from the instant messaging number information of the user, the weather may be returned according to the acquired IP address of the mobile phone number of the user. if the location of the user cannot be obtained from the instant messaging number information of the user, and the IP address of the mobile phone number of the user cannot be obtained either, the weather in Beijing may be returned by default, with no specific limit to details of the process thereof, which may be set flexibly according to an actual situation.

Note in addition that when the weather of the location of a friend of the user is returned, it is not required to return the weather of locations of all friend of the user, but may return only the weather of a location with an abnormal weather condition (for example, an extreme weather condition such as rain, snow, extremely high temperature, or the like) based on the weather of locations of friend of the user. A rule for returning weather may be preset, and the weather of the location of a friend of the user that conforms to the rule may be returned.

In another example, if the searched-out information is displayed by using a direct-area service, then after the user inputs a keyword "birthday" in a direct area of zodiac sign/birthday, content of a zodiac sign or a birthday relevant to the user may be returned according to the birthday of the user obtained from the instant messaging number information of the user. And content of a zodiac sign or a birthday relevant to a friend of the user may be returned according to the birthday of a friend of the user obtained from the instant messaging number information, and an entrance for notifying content of a zodiac sign or a birthday of a friend of the user may be displayed, such that the user may interact with the friend.

Note that the entrance for notifying may be an instant messaging chatting window, an address of an instant messaging space, a mobile phone number, or the like of a friend of the user.

Note in addition that information of a cyber acquaintance (who is not a friend of the user) the user may desire to know (for example, a cyber acquaintance of opposite sex with a matching zodiac sign, a cyber acquaintance with the same birthday, or the like) may also be sent to the user according to a common point of the user information with information of the cyber acquaintance.

In step 203, the searched-out information that matches the keyword and is relevant to the user information is displayed by using a direct-area service.

With the information searching method according to an embodiment of the present disclosure, it is possible to perform search according to the acquired keyword and the user information to obtain searched-out information that matches the keyword and is relevant to the user information. The information obtained with the described searching method is highly relevant to the user, thereby enhancing the relevance between the searched-out information and the user. Search may be performed according to the keyword and the basic personal information of the user or according to the keyword and the friend information of the user, so as to obtain searched-out information that matches the keyword and is relevant to the basic personal information of the user, or searched-out information that matches the keyword and is relevant to the friend information of the user, such that not only information the user himself/herself needs may be found, but information relevant to the present keyword and needed by a friend of the user may also be found via the friend information of the user, thus further enhancing the relevance between the searched-out information and the user. The searched-out information that matches the keyword and is relevant to the friend information of the user may be sent to a friend of the user, which increases interaction between the user and a friend of the user. The searched-out information that matches the keyword and is relevant to the user information may be displayed by using a direct-area service, so that the searched-out information is displayed straightforwardly.

Embodiment 3

Figure 3:
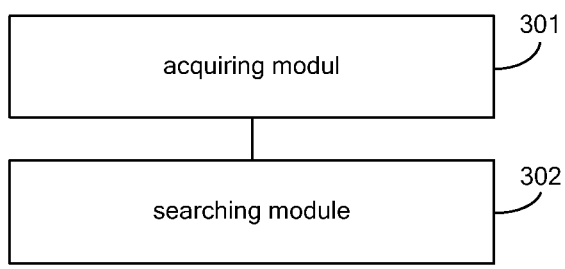
FIG. 3 is a schematic diagram of a structure of an information searching device provided in Embodiment 3 of the present disclosure.

Referring to FIG. 3, an embodiment of the present disclosure provides an information searching device, including:

an acquiring module 301 configured to acquire a keyword for search input by a user, and acquire user information of the user;

a searching module 302 configured to, after the acquiring module 301 acquires the keyword input by a user and acquires the user information, perform search according to the keyword and the user information to obtain searched-out information that matches the keyword and is relevant to the user information.

Furthermore, the user information may include basic personal information of the user and/or friend information of the user, and the searching module 302 may include:

a first searching unit configured to, after the acquiring module obtains the keyword input by the user and obtains the user information, perform search according to the keyword and the basic personal information of the user to obtain searched-out information that matches the keyword and is relevant to the basic personal information of the user; and/or a second searching unit configured to, after the acquiring module obtains the keyword input by the user and obtains the user information, perform search according to the keyword and the friend information of the user to obtain searched-out information that matches the keyword and is relevant to the friend information of the user.

Figure 4:
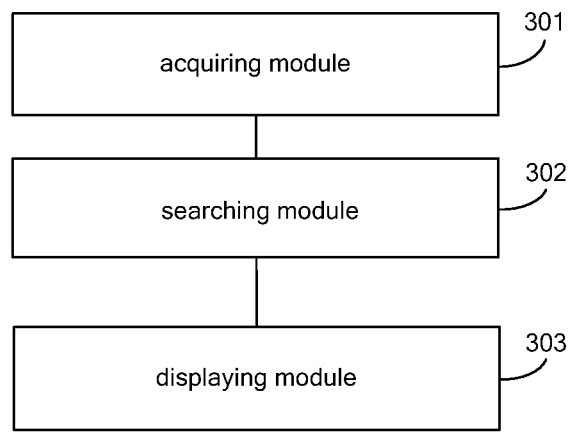
FIG. 4 is a schematic diagram of a structure of another information searching device provided in Embodiment 3 of the present disclosure.

Referring to FIG. 4, the device may further include:

a displaying module 303 configured to display the searched-out information.

In some examples, it may be displayed the searched-out information that matches the keyword and is relevant to the user information. Specifically, it may be displayed the searched-out information that matches the keyword and is relevant to the basic personal information of the user; and/or it may be displayed the searched-out information that matches the keyword and is relevant to the friend information of the user.

Furthermore, the displaying module 303 may include:

a displaying unit configured to display the searched-out information in a direct area.

Figure 5:
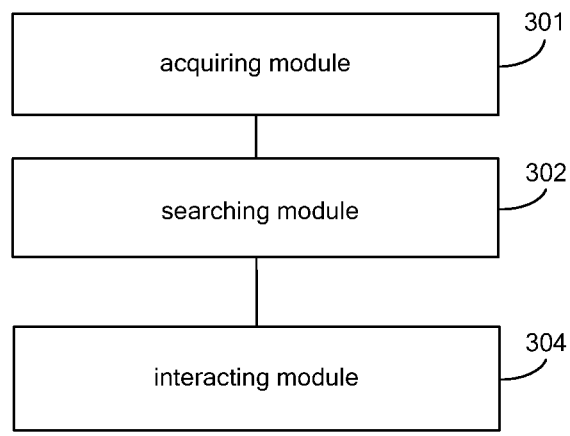
FIG. 5 is a schematic diagram of a structure of yet another information searching device provided in Embodiment 3 of the present disclosure.

Referring to FIG. 5, the device may further include:

an interacting module 304 configured to, when a friend notification information sent by the user is received, send the searched-out information that matches the keyword and is relevant to the friend information of the user to a friend of the user.

With the information searching device according to an embodiment of the present disclosure, it is possible to perform search according to the acquired keyword and the user information to obtain searched-out information that matches the keyword and is relevant to the user information. The information obtained with the described searching device is highly relevant to the user, thereby enhancing the relevance between the searched-out information and the user. Search may be performed according to the keyword and the basic personal information of the user or according to the keyword and the friend information of the user, so as to obtain searched-out information that matches the keyword and is relevant to the basic personal information of the user, or searched-out information that matches the keyword and is relevant to the friend information of the user, such that not only information the user himself/herself needs may be found, but information relevant to the keyword and needed by a friend of the user may also be found via the friend information of the user, thus further enhancing the relevance between the searched-out information and the user. The searched-out information that matches the keyword and is relevant to the friend information of the user may be sent to a friend of the user, which increases interaction between the user and a friend of the user. The searched-out information that matches the keyword and is relevant to the user information may be displayed by using a direct-area service, so that the searched-out information is displayed straightforwardly.

When implemented in form of a software functional module and sold or used as an independent product, an integrated module of an embodiment of the present disclosure may also be stored in a computer-readable storage medium. Based on such an understanding, the essential part (or a part of the technical solution of an embodiment of the present disclosure contributing to prior art) may appear in form of a software product, which software product is stored in storage media, and includes a number of instructions for allowing a computing equipment (such as a personal computer, a server, a network equipment, or the like) to execute all or part of the methods in various embodiments of the present disclosure. The storage media include various media that can store program codes, such as a U disk, a mobile hard disk, a Read-Only Memory (ROM), a Random Access Memory (RAM), a magnetic disk, a CD, and the like. Thus, an embodiment of the present disclosure is not limited to any specific combination of hardware and software.

Accordingly, an embodiment of the present disclosure further provides a computer storage medium in which a computer program is stored, which computer program is for executing the information searching method according to an embodiment of the present disclosure.

What described are merely preferred embodiments of the disclosure, and are not intended to limit the scope of the present disclosure. Any modification, equivalent replacement, improvement, and the like made within the principle of the present disclosure should be included in the scope of the present disclosure.

The invention claimed is:

1. An information searching method, comprising:
   acquiring a keyword for search input by a user, and acquiring user information of the user; and
   performing search according to the keyword and the user information to obtain searched-out information that matches the keyword and is relevant to the user information,
   wherein the user information comprises basic personal information of the user and friend information of the user,
   wherein the performing search according to the keyword and the user information to obtain searched-out information that matches the keyword and is relevant to the user information comprises:
      performing search according to the keyword and the basic personal information of the user to obtain searched-out information that matches the keyword and is relevant to the basic personal information of the user; and
      performing search according to the keyword and the friend information of the user to obtain searched-out information that matches the keyword and is relevant to the friend information of the user,
   when a friend notification information sent by the user is received, sending the searched-out information that matches the keyword and is relevant to the friend information of the user to a friend of the user according to an entrance for notifying; wherein the entrance for notifying comprises: an instant messaging chatting window, an address of an instant messaging space, a mobile phone number of the friend of the user,
   sending information of a cyber-acquaintance who the user may desire to know to the user, according to a common point of the user information and information of the cyber-acquaintance; wherein the cyber-acquaintance is not a friend of the user.

2. The method according to claim 1, further comprising: displaying the searched-out information.

3. The method according to claim 2, wherein the displaying the searched-out information comprises:
   displaying the searched-out information by using a direct-area service.

4. An information searching device, comprising:
   an acquiring module configured to acquire a keyword for search input by a user, and acquire user information of the user; and
   a searching module configured to perform search according to the keyword and the user information to obtain searched-out information that matches the keyword and is relevant to the user information,
   wherein the user information comprises basic personal information of the user and friend information of the user,
   wherein the searching module comprises:

a first searching unit configured to, after the acquiring module obtains the keyword input by the user and obtains the user information, perform search according to the keyword and the basic personal information of the user to obtain searched-out information that matches the keyword and is relevant to the basic personal information of the user; and a second searching unit configured to, after the acquiring module obtains the keyword input by the user and obtains the user information, perform search according to the keyword and the friend information of the user to obtain searched-out information that matches the keyword and is relevant to the friend information of the user, an interacting module configured to, when a friend notification information sent by the user is received, send the searched-out information that matches the keyword and is relevant to the friend information of the user to a friend of the user according to an entrance for notifying; wherein the entrance for notifying comprises: an instant messaging chatting window, an address of an instant messaging space, a mobile phone number of the friend of the user, wherein the information searching device further comprises:

a sending module configured to send information of a cyber-acquaintance who the user may desire to known to the user, according to a common point of the user information and information of the cyber-acquaintance; wherein the cyber-acquaintance is not a friend of the user.

5. The device according to claim 4, further comprising:
a displaying module configured to display the searched-out information.

6. The device according to claim 5, wherein the displaying module comprises:
a displaying unit configured to display the searched-out information by using a direct-area service.

7. A non-transitory computer-readable storage medium storing instructions thereon for execution by at least one processing circuit, the instructions comprising:
acquiring a keyword for search input by a user, and acquiring user information of the user; and
performing search according to the keyword and the user information to obtain searched-out information that matches the keyword and is relevant to the user information, wherein the user information comprises basic personal information of the user and) friend information of the user, wherein the performing search according to the keyword and the user information to obtain searched-out information that matches the keyword and is relevant to the user information comprises:
performing search according to the keyword and the basic personal information of the user to obtain searched-out information that matches the keyword and is relevant to the basic personal information of the user; and
performing search according to the keyword and the friend information of the user to obtain searched-out information that matches the keyword and is relevant to the friend information of the user, wherein the instructions further comprises: after the performing search,
when a friend notification information sent by the user is received, sending the searched-out information that matches the keyword and is relevant to the friend information of the user to a friend of the user according to an entrance for notifying; wherein the entrance for notifying comprises: an instant messaging chatting window, an address of an instant messaging space, a mobile phone number of the friend of the user, sending information of a cyber-acquaintance who the user may desire to known to the user, according to a common point of the user information and information of the cyber-acquaintance; wherein the cyber-acquaintance is not a friend of the user.

8. The non-transitory computer-readable storage medium according to claim 7, wherein the instructions further comprises: after the performing search,
displaying the searched-out information.

9. The non-transitory computer-readable storage medium according to claim 8, wherein the displaying the searched-out information comprises:
displaying the searched-out information by using a direct-area service.

* * * * *